United States Patent [19]

DePoy et al.

[11] Patent Number: 5,391,137
[45] Date of Patent: Feb. 21, 1995

[54] AIRBAG FOLDING APPARATUS AND METHOD

[75] Inventors: Jerry DePoy, Bradford; Scott F. Mason, New Carlisle, both of Ohio

[73] Assignee: The Omega Company Inc., Dayton, Ohio

[21] Appl. No.: 145,968

[22] Filed: Oct. 29, 1993

[51] Int. Cl.[6] ............................................. B60R 21/16
[52] U.S. Cl. ..................................... 493/405; 493/451
[58] Field of Search ............... 493/243, 244, 256, 267, 493/314, 405, 406, 450, 458, 451, 940, 454; 280/743; 53/429

[56] References Cited

U.S. PATENT DOCUMENTS

| | | |
|---|---|---|
| 3,839,947 | 10/1974 | Kornas et al. |
| 3,839,948 | 10/1974 | Putti et al. |
| 4,235,453 | 11/1980 | Lawson et al. |
| 4,351,544 | 9/1982 | Ross |
| 4,930,986 | 2/1990 | Cok et al. |
| 5,022,675 | 6/1991 | Zelenka, Jr. et al. |
| 5,162,035 | 11/1992 | Baker ................................ 493/405 |
| 5,163,893 | 11/1992 | Hara .................................. 493/458 |
| 5,300,011 | 4/1994 | Budde ............................... 493/458 |

Primary Examiner—Jack W. Lavinder
Attorney, Agent, or Firm—Killworth, Gottman, Hagan & Schaeff

[57] ABSTRACT

An apparatus is provided for folding an airbag. The apparatus includes tables for supporting the airbag. A securement mechanism is associated with the tables and secures the airbag in position relative to the tables. A carriage is provided and is movable towards and away from the tables. A clamping mechanism is associated with the carriage and clamps a first portion of the airbag to the tables. First and second sets of folding blades are also associated with the carriage. The first and second sets of folding blades grasp second and third portions of the airbag and create first folds in the airbag to form a partially folded airbag. An engagement mechanism engages the partially folded airbag to maintain the first folds in the partially folded airbag. The securement mechanism further rotates the engaged partially folded airbag about a vertical axis. The first and second sets of folding blades additionally grasp opposing portions of the partially folded airbag to create second folds in the partially folded airbag to form a completely folded airbag.

12 Claims, 11 Drawing Sheets

AIRBAG FOLDING APPARATUS AND METHOD

BACKGROUND OF THE INVENTION

The present invention relates to folding apparatus and, more particularly, to an apparatus and method for folding airbags.

Use of airbags for driver and passenger restraint during vehicle impact has grown increasingly popular. Typically, airbags are circular, oval or pillow-shaped. They are commonly mounted in steering wheels, steering columns, and dashboards of automobiles. Only a limited space is available for airbag storage. Accordingly, airbags must be folded to fit within the limited space available for their storage. However, the airbags must also be capable of unfolding and inflating rapidly without binding.

Currently, there are many methods by which an airbag may be folded into a desired configuration or pattern. Oftentimes, these methods are performed manually. Manual methods, however, are costly and usually result in airbags having inconsistent folds.

It is not uncommon for each automotive manufacturer to have its own folding pattern. For any particular folding pattern, new methods and apparatus are desired which will reduce costs and improve the consistency of the folds created in the airbags.

SUMMARY OF THE INVENTION

In accordance with a first aspect of the present invention, an apparatus is provided for folding an airbag for subsequent installation and use in an automotive vehicle. The apparatus comprises: means for supporting an airbag to be folded; means for securing an airbag in position relative to the supporting means; a carriage movable towards and away from the supporting means and the securing means; means associated with the carriage for clamping a first portion of the airbag to the supporting means; first and second folding means associated with the carriage for grasping second and third portions of the airbag and creating first folds in the airbag to form a partially folded airbag; and, means for engaging the partially folded airbag for maintaining the first folds in the partially folded airbag. The securing means further serves to rotate the engaged partially folded airbag about a vertical axis. The first and second folding means additionally serve to grasp opposing portions of the partially folded airbag for creating second folds in the partially folded airbag to form a completely folded airbag.

The first folding means comprises a first pair of folding blades supported by first carrier means for transverse movement along a first axis and for rotational movement about a second axis which is generally transverse to the first axis. The second folding means comprises a second pair of folding blades supported by a second carrier means for transverse movement generally along the first axis and for rotational movement about a third axis which is generally transverse to the first axis. The clamping means comprises a pivotable blade positioned between the first and second folding means.

The supporting means comprises: first and second spring-biased plates; third and fourth plates which are vertically movable; and fifth and sixth plates which are horizontally movable.

The airbag includes a can portion secured to an inflatable bag portion. The securing means comprises a fixture, grippers associated with the fixture for locking the can portion to the fixture, and means for rotating the fixture about the vertical axis.

The engaging means comprises: a main support; means for reciprocating the main support towards and away from the supporting means; means for rotating the main support about a vertical axis; and, a plurality of reciprocating fold retainers for engaging the airbag. Each of the reciprocating fold retainers comprises a piston/cylinder unit and a rubber engagement member secured to the distal end of the piston/cylinder unit.

The main support includes first and second lower support plates each having at least one engagement pin for engaging a corresponding opening in the fixture. The engaging means further comprises stripper means for engaging the completely folded airbag as the first and second folding means release and move away from the completely folded airbag.

In accordance with a second aspect of the present invention, a method is provided for folding an airbag. The method comprises the steps of: clamping a first portion of the airbag; folding second and third portions of the airbag to create first folds in the airbag to form a partially folded airbag; engaging the partially folded airbag to maintain the first folds in the partially folded airbag; rotating the engaged partially folded airbag about a vertical axis; and, folding opposing portions of the partially folded airbag to create second folds in the partially folded airbag to form a completely folded airbag.

The step of folding second and third portions of the airbag to create first folds in the airbag comprises the steps of: grasping the second portion of the airbag with a first pair of folding blades; grasping the third portion of the airbag with a second pair of folding blades; and, moving the first and second sets of blades toward one another while simultaneously rotating each of the first and second sets of folding blades.

The step of folding opposing portions of the partially folded airbag to form second folds in the partially folded airbag comprises the steps of: grasping one of the opposing portions of the partially folded airbag with the first pair of folding blades; grasping the other of the opposing portions of the partially folded airbag with the second pair of folding blades; and, moving the first and second sets of blades toward one another while simultaneously rotating each of the first and second sets of folding blades.

Accordingly, it is an object of the present invention to provide a method and apparatus which may be applied to fold airbags for subsequent installation and use in an automotive vehicle. It is a further object of the present invention to provide a method and apparatus for grasping, rotating and transversely moving various portions of a workpiece to create various folds therein. These and further objects and features of the present invention will become apparent from the following description, the accompanying drawings and the appended claims.

DETAILED DESCRIPTION OF THE INVENTION

Figure 1:
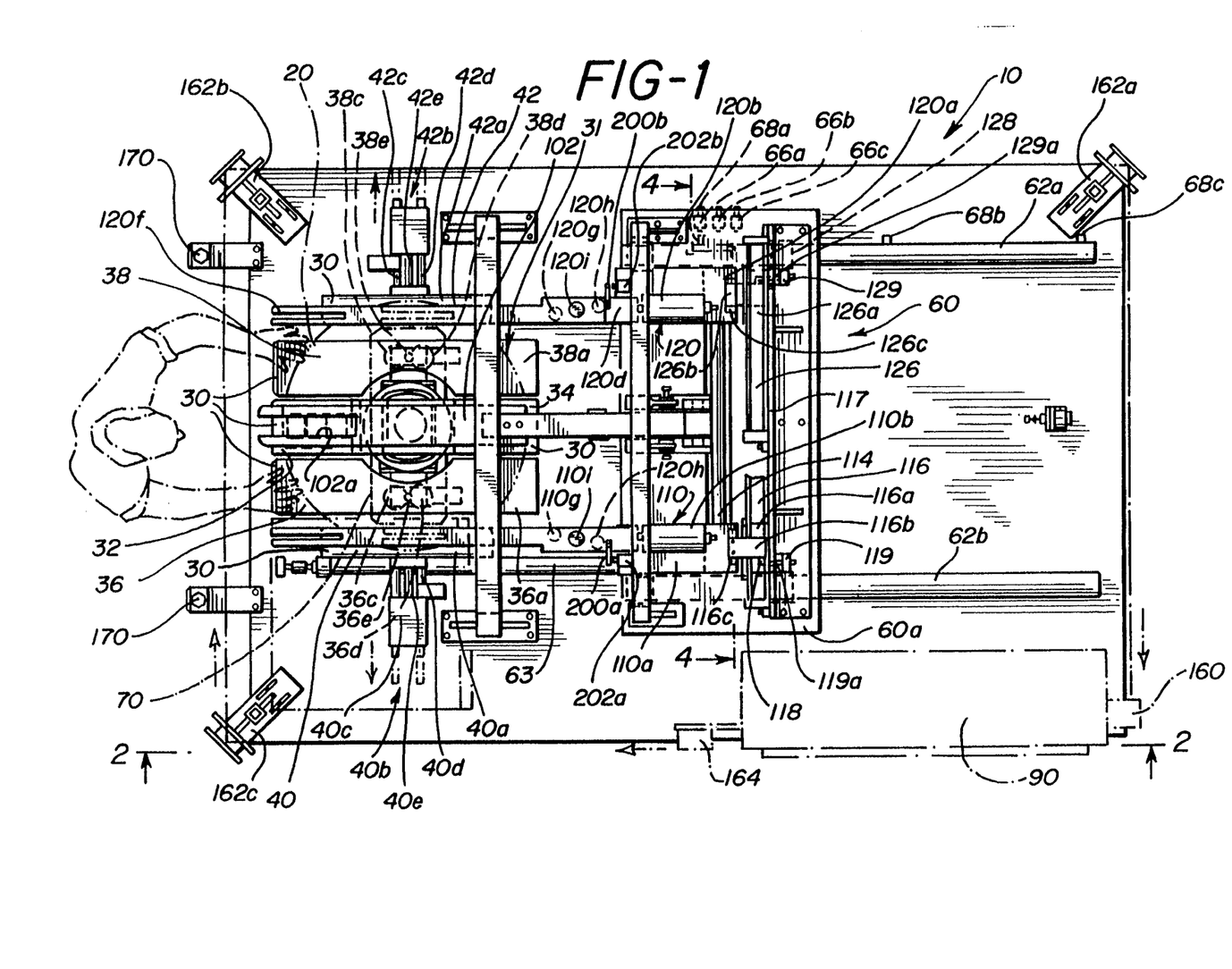
FIG. 1 is a plan view of a folding apparatus constructed in accordance with the present invention.

Reference is now made to FIG. 1, where apparatus 10 for folding an airbag 20 in accordance with the present invention is shown. The airbag 20 comprises a can portion 22 secured to an inflatable bag portion 24, see FIG. 11. The apparatus 10 includes movable support tables 30 which define a bag folding area 31, lower tooling 50 for securing the can portion 22 within the bag folding area 31, a movable carriage 60 which reciprocates towards and away from the bag folding area 31, and upper tooling 70 which reciprocates vertically towards and away from the movable support tables 30, see also FIGS. 2 and 3.

Referring to FIGS. 1 and 9-11, the movable support tables 30 include first and second tables 32 and 34, third and fourth tables 36 and 38, and fifth and sixth tables 40 and 42. The first table 32 comprises a pedestal 32a having at its upper end a plate 32b with four bores 32c extending therethrough. Four bolts 32d-32g pass through the bores 32c and each is threadedly received in a corresponding threaded opening in an upper plate 32h. Positioned about each of the bolts 32d-32g is a spring 32k. The springs 32k act together to bias the upper plate 32h in an upward direction away from the plate 32b.

Figure 9:
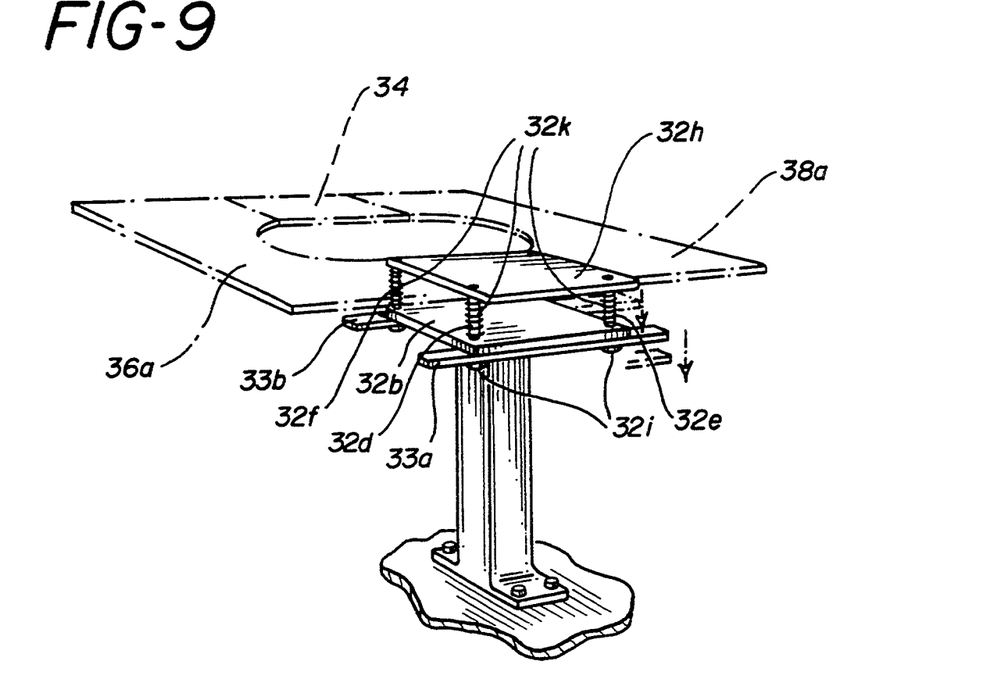
FIG. 9 is a perspective view of a first table of the folding apparatus of FIG. 1.

A first aluminum bar 33a is positioned beneath the plate 32b. The bolts 32d and 32e pass through corresponding bores in the bar 33a. The bar 33a is positioned between the lower surface 32j of the plate 32b and respective head portions 32i of the bolts 32d and 32e. A second aluminum bar 33b is also positioned beneath the plate 32b. The bolts 32f and 32g pass through corresponding bores in the bar 33b. The bar 33b is positioned between the lower surface 32j of the plate 32b and the respective head portions 32i of the bolts 32f and 32g.

Figure 10:
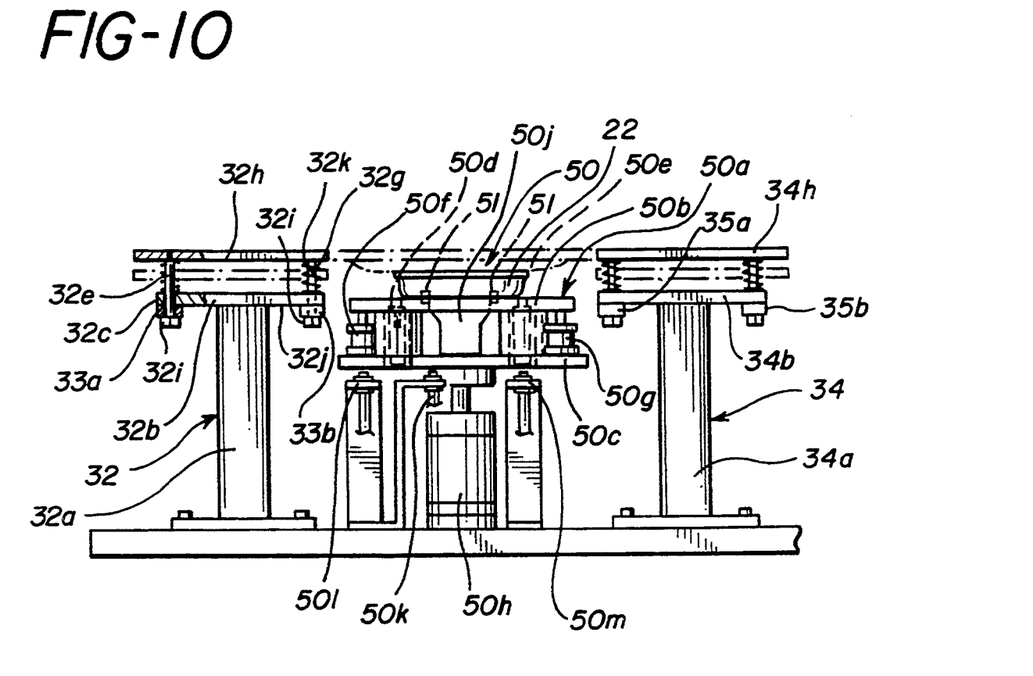
FIG. 10 is a side view of the first and second tables and lower tooling of the folding apparatus of FIG. 1.

The second spring-biased table 34 is constructed in essentially the same manner as the first spring-biased table 32, see FIG. 10. The table 34 includes a pedestal 34a having a plate 34b, a spring-biased upper plate 34h and first and second bars 35a and 35b positioned beneath the plate 34b.

Figure 3:
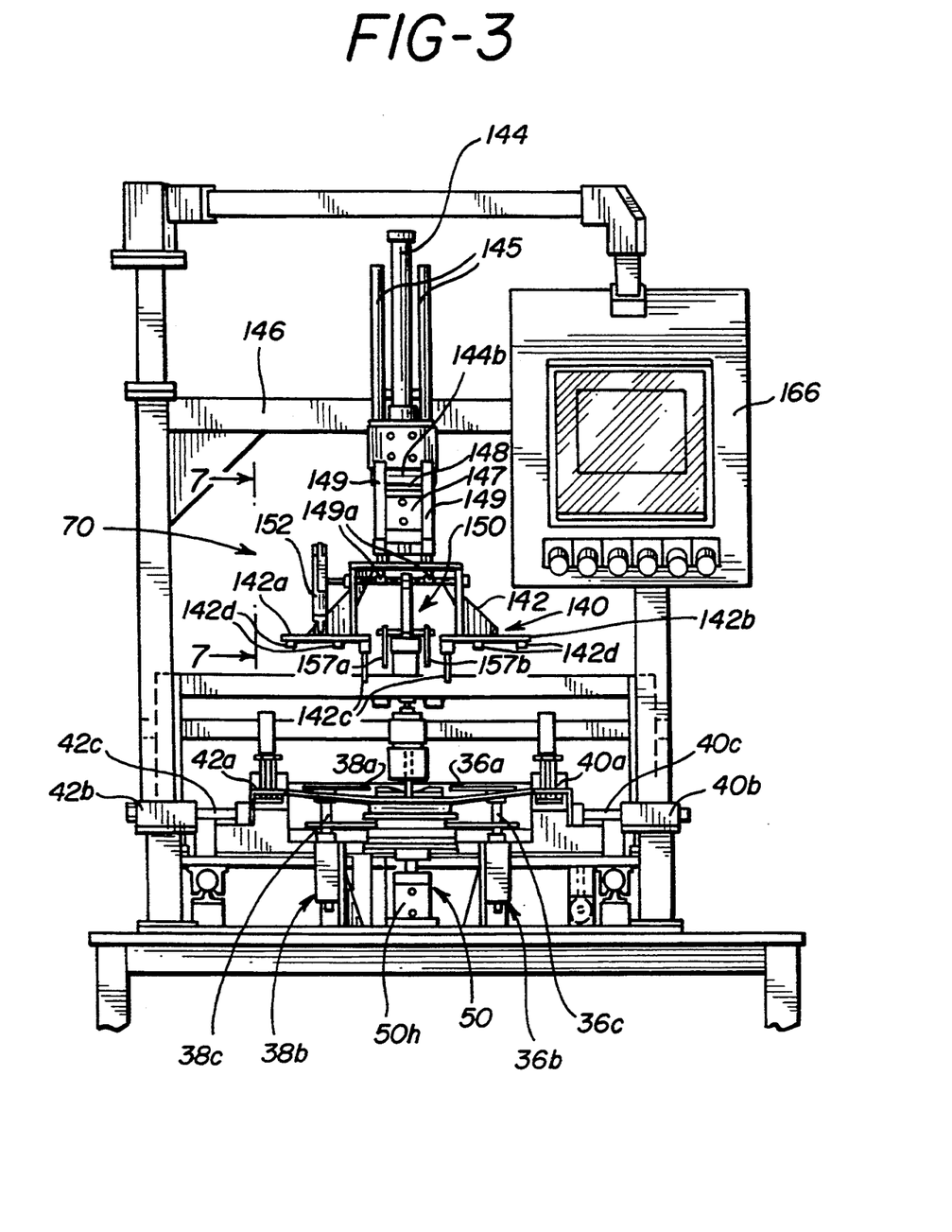
FIG. 3 is a view taken along line 3—3 in FIG. 2.

The third table 36 comprises an upper plate 36a connected to a piston/cylinder drive unit 36b, see FIGS. 1 and 3. The drive unit 36b includes first and second guide rods 36c and 36d and a drive piston 36e interposed between the first and second guide rods 36c and 36d. The drive piston 36e is fixedly connected to the plate 36a for vertically reciprocating the plate 36a up and down. The fourth table 38 comprises an upper plate 38a connected to a piston/cylinder drive unit 38b. The drive unit 38b includes first and second guide rods 38c and 38d and a drive piston 38e interposed between the first and second guide rods 38c and 38d. The drive piston 38e is connected to the plate 38a for vertically reciprocating the plate 38a up and down.

The fifth table 40 comprises a plate 40a connected to a piston/cylinder drive unit 40b. The drive unit 40b includes first and second guide rods 40c and 40d and a drive piston 40e interposed between the first and second guide rods 40c and 40d. The drive piston 40e is fixedly connected to the plate 40a for horizontally reciprocating the plate 40a towards and away from the plate 36a. The sixth table 42 comprises an upper plate 42a connected to a piston/cylinder drive unit 42b. The drive unit 42b includes first and second guide rods 42c and 42d and a drive piston 42e interposed between the first and second guide rods 42c and 42d. The drive piston 42e is connected to the plate 42a for horizontally reciprocating the plate 42a towards and away from the plate 38a.

The lower tooling 50 includes a fixture 50a which is adapted to receive and lock into position the can portion 22 of the airbag 20, see FIG. 10. The fixture 50a comprises first and second plates 50b and 50c, first and second guide rods 50d and 50e, first and second piston/cylinder units 50f and 50g interposed between the first and second plates 50b and 50c for vertically moving the first plate 50b relative to the second plate 50c, and a rotary drive unit 50h for rotating the first and second plates 50b and 50c back and forth through an angle of approximately 90°.

The first plate 50b receives on its upper surface the can portion 22 of the airbag 20, see FIG. 10. The can portion 22 is provided with an opening 22b, see FIG. 11. A gripper unit 50j is fixedly connected to the first plate 50b and is provided with first and second grippers 51 which extend through a recess 50i in the first plate 50b. The grippers 51 are movable toward and away from one another. After the can portion 22 has been placed on the upper surface of the first plate 50b, the first and second grippers 51 move apart from one another to grip opposing edge portions of the opening 22b to secure the can portion 22 in position prior to folding. The grippers 51 move toward one another after folding has been completed to release the can portion 22.

First, second and third proximity sensors 50k, 50l and 50m are positioned below the second plate 50c, see FIG. 10. The first and second sensors 50k and 50l are positioned such that the second sensor 50l is positioned directly below and senses the second plate 50c only when the can portion 22 is positioned in a first folding position and the first sensor 50k is positioned directly below and senses the second plate 50c only when the can portion 22 is positioned in a second folding position. The sensor 50m is positioned such that it is below the second guide rod 50e when the can portion 22 is positioned in its first folding position and senses the guide rod 50e when the first plate 50b is in its "down" position. Accordingly, the sensor 50m provides an indication regarding whether the first plate 50b and the can portion 22 are in a raised or a lowered position.

Figure 2:
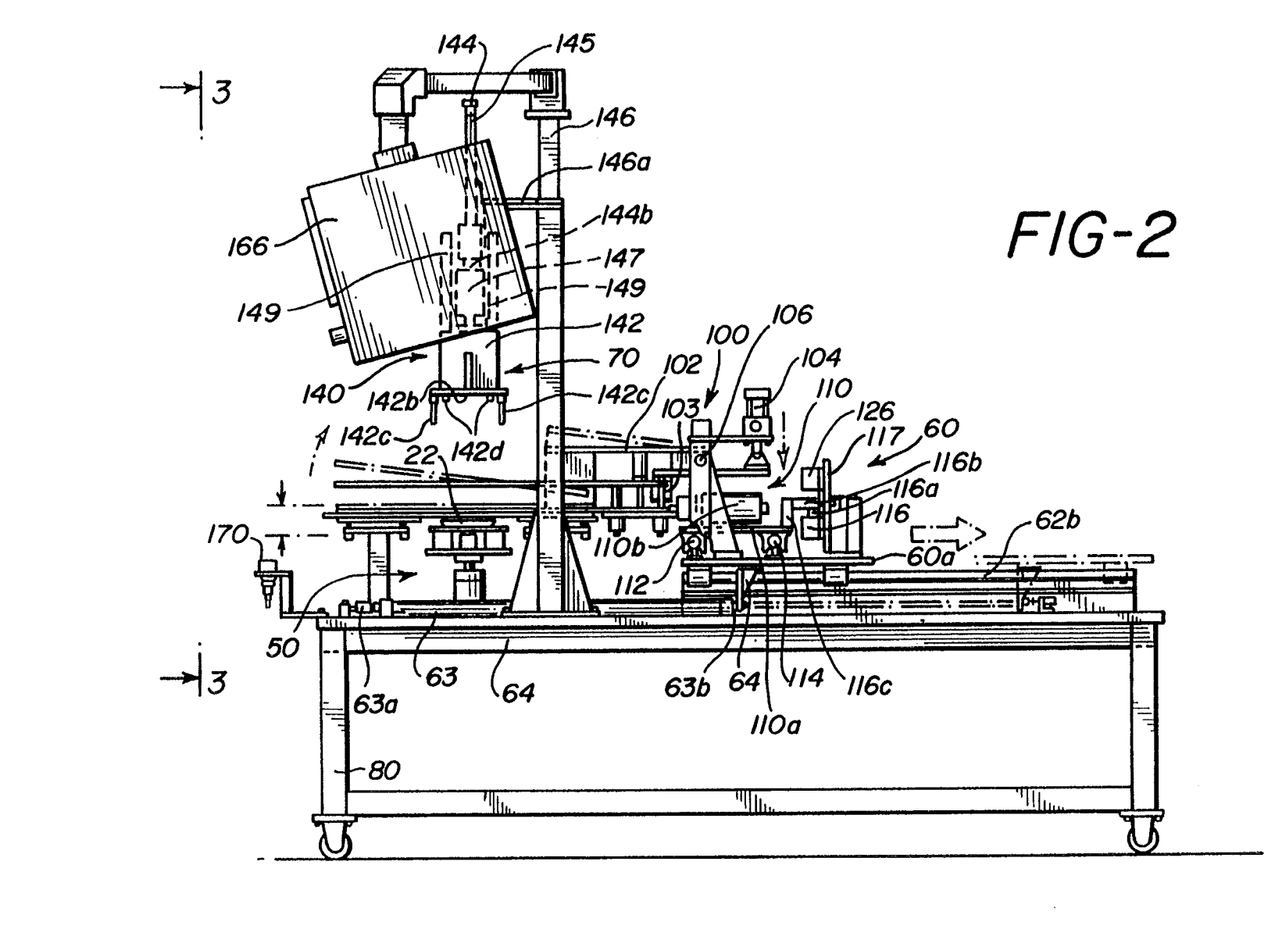
FIG. 2 is a view taken along line 2—2 in FIG. 1.

The movable carriage 60 reciprocates towards and away from the bag folding area 31 on guide rods 62a and 62b, see FIGS. 1 and 2. A drive unit 63 comprising back-to-back cylinders is connected at its first end 63a to a support table 80 and at its second end 63b to a bracket 64, see FIG. 2. The movable carriage 60 includes a carriage plate 60a. The bracket 64 is secured to the underside of the carriage plate 60a. The drive unit 63 moves the carriage 60 between a first folding position, shown in FIG. 2, a second folding position, and a retracted position, shown in phantom in FIG. 2.

First, second and third proximity sensors 66a–66c are secured to the carriage 60, see FIG. 1. Pins 68a–68c are staggered along the guide rod 62a. When the carriage 60 is located at its first folding position, the sensor 66a will be across from and sense pin 68a. When the carriage is positioned at its second folding position, the sensor 66b will be across from and sense pin 68b. When the carriage 60 is positioned in its retracted position, the sensor 66c will be across from and sense pin 68c. The proximity sensors 66a–66c generate signals which are received by a control unit 90. Those generated signals indicate to the control unit 90 the position of the carriage 60 along the guide rods 62a and 62b.

Secured to the carriage plate 60a is a clamping mechanism 100 comprising a pivotable blade 102 and a piston/cylinder unit 104, see FIG. 2. Fixedly secured to the pivotable blade 102 is a stop block 103. The piston/cylinder unit 104 is connected to the blade 102 for effecting pivotable movement of the blade 102 about a pin 106.

Figure 5:
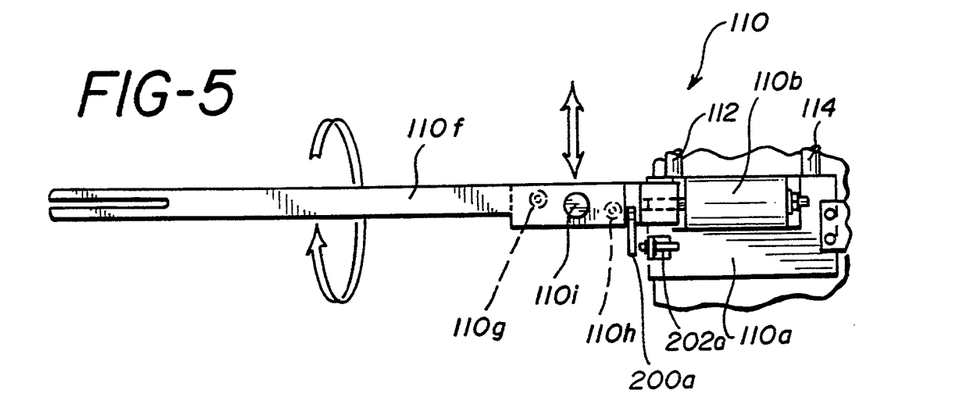
FIG. 5 is a plan view of a first folding mechanism of the folding apparatus shown in FIG. 1.
Figure 6:
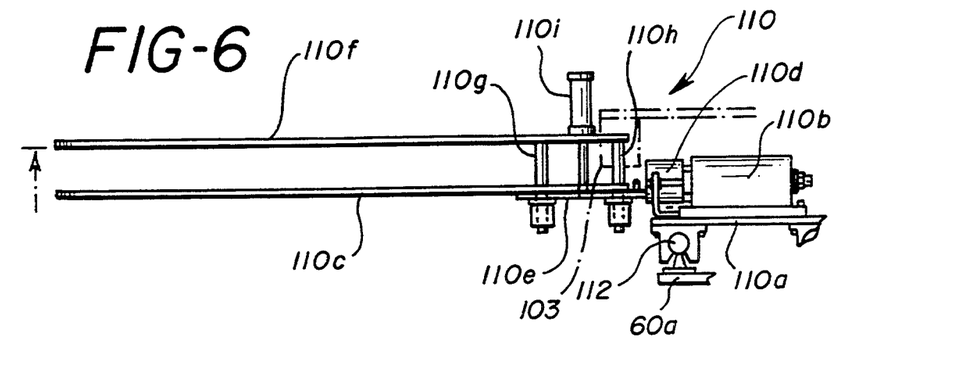
FIG. 6 is a side view of the first folding mechanism shown in FIG. 5.
Figure 11:
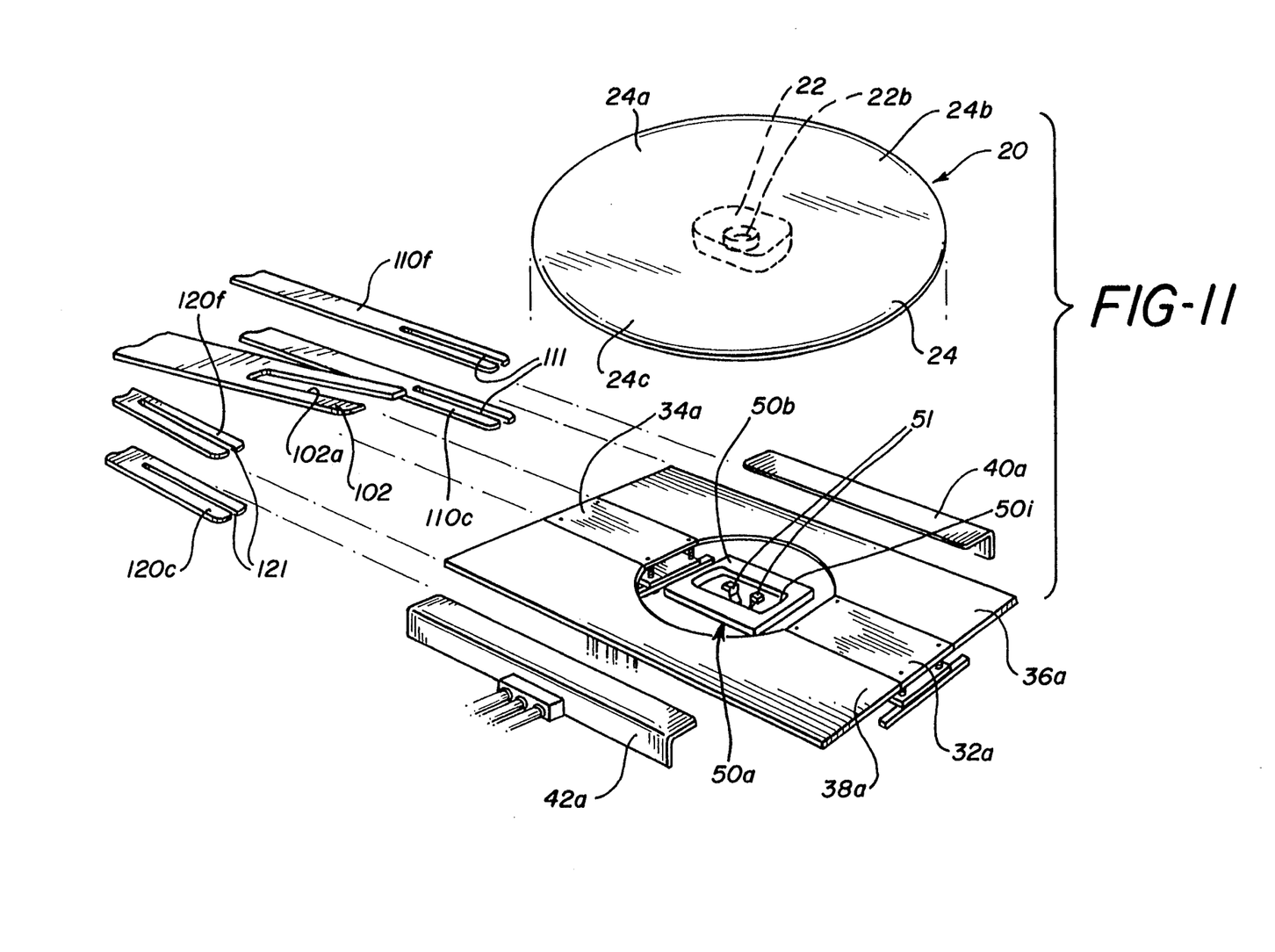
FIG. 11 is a schematic perspective view showing the tables, pivotable blade and first and second sets of folding blades prior to the folding of an airbag.

First and second folding mechanisms 110 and 120 are provided on the carriage 60, see FIGS. 1, 2 and 11. Both the first and second folding mechanisms 110 and 120 reciprocate along guide rails 112 and 114. The first folding mechanism 110 comprises a support plate 110a having a rotary drive unit 110b fixedly secured thereon, see also FIGS. 4–6. A first folding blade 110c is coupled to the rotary drive unit 110b via a hub 110d and a plate 110e weldably secured to the hub 110d. A second folding blade 110f is positioned over the first folding blade 110c and reciprocates along guide rods 110g and 110h towards and away from the first folding blade 110c. A piston/cylinder unit 110i is connected to the first and second blades 110c and 110f and effects reciprocating movement of the second blade 110f relative to the first blade 110c. Because the second blade 110f is coupled to the first blade 110c via the guide rods 110g and 110h and the piston/cylinder unit 110i, rotation of the first blade 110c via the rotary drive unit 110b also effects rotational movement of the second blade 110f.

The support plate 110a reciprocates along the guide rails 112 and 114, which are fixed to the carriage plate 60a, see FIG. 2. A first rodless cylinder 116 is secured to a backing plate 117 which, in turn, is secured to the carriage plate 60a, see FIG. 4. The cylinder 116 includes a first reciprocating member 116a. Fixedly connected to the first member 116a is a second member 116b. A third member 116c is fixedly connected to the support plate 110a and is provided with a recess 116d for receiving the second member 116b. Reciprocating movement of the first and second members 116a and 116b effects reciprocating movement of the support plate 110a along the guide rails 112 and 114 via third member 116c.

The second folding mechanism 120 comprises a support plate 120a having a rotary drive unit 120b fixedly secured thereon, see FIG. 1. A first folding blade 120c is coupled to the rotary drive unit 120b via a coupling 120d comprising a hub and a plate weldably secured to the hub, see also FIG. 11. A second folding blade 120f is positioned over the first folding blade 120c for reciprocating movement towards and away from the first folding blade 120c. Guide rods 120g and 120h and a piston/cylinder unit 120i are connected to the first and second blades 120c and 120f. The piston/cylinder unit 120i effects reciprocating movement of the second blade 120f relative to the first blade 120c. Since the second blade 120f is coupled to the first blade 120c via the guide rods 120g and 120h and the piston/cylinder unit 120i, rotation of the first blade 120c via the rotary drive unit 120b also effects rotational movement of the second blade 120f.

The support plate 120a reciprocates along the guide rails 112 and 114, see FIG. 2. A second rodless cylinder 126 is secured to the backing plate 117. The cylinder 126 includes a first reciprocating member 126a, see FIG. 4. Fixedly connected to the first member 126a is a second member 126b. A third member 126c is fixedly connected to the support plate 120a and is provided with a recess 126d for receiving the second member 126b. Reciprocating movement of the first and second members 126a and 126b effects reciprocating movement of the support plate 120a along the guide rails 112 and 114 via third member 126c.

Figure 4:
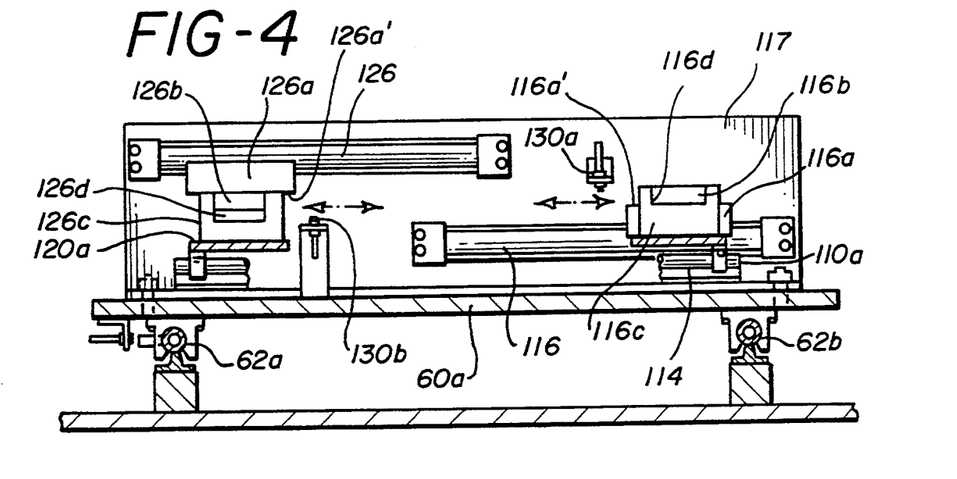
FIG. 4 is a view taken along section line 4—4 in FIG. 1.

As shown in FIG. 4, proximity sensors 130a and 130b are provided adjacent to the first and second rodless cylinders 116 and 126. The sensors 130a and 130b sense the inner edges 116a' and 126a' of the first members 116a and 126b when those edges 116a' and 126a' are positioned directly across from the sensors 130a and 130b. When the edges 116a' and 126a' are positioned directly across from the sensors 130a and 130b, the first and second folding mechanisms 110 and 120 are positioned in their second folding positions.

Stop members 118 and 128 are fixedly secured to outer surfaces of the members 116b and 126b, see FIG. 1. First and second piston/cylinder units 119 and 129 are fixedly secured to the plate 117, see FIG. 1. When the units 119 and 129 are actuated, their pistons 119a and 129a extend outwardly for engagement with the first and second stop members 118 and 128 as the first and second folding mechanisms 110 and 120 move outwardly along the guide rails 112 and 114 after first folds have been created in the airbag 20. When the first and second folding mechanisms 110 and 120 have been moved outwardly such that the pistons 119a and 129a are engaged with the stop members 118 and 128, the first and second folding mechanisms 110 and 120 are positioned in their second folding positions.

The upper tooling 70 comprises a hold-down mechanism 140 and a stripper mechanism 150, see FIG. 3. The hold-down mechanism 140 includes a main support 142 having first and second lower plates 142a and 142b, see also FIGS. 2, 7 and 8. Each of the plates 142a and 142b is provided with fixture engagement pins 142c and hold-down elements, such as rubber stoppers 142d. A piston/cylinder unit 144 and first and second guide rods 145 are connected to a support frame 146 via a bracket 146a, see FIGS. 2 and 3. The piston/cylinder unit 144 includes a piston 144a fixedly connected to a plate slide 144b which, in turn, is connected to a rotary actuator 147 via an adapter plate 148, see FIGS. 3 and 7. The rotary actuator 147 is connected to the main support 142 such that reciprocating movement of the piston 144a and slide 144b effects reciprocating movement of the main support 142. Additionally, rotary movement of the rotary actuator 147 effects rotational movement of the main support 142.

Four fold retaining piston/cylinder units 149 are provided on the main support 142. A hold-down element, such as a rubber stopper 149a, is fixedly connected at the distal end of each piston of the piston/cylinder units 149, see FIG. 3. When the main support 142 is lowered to its down position, the pins 142c enter into corresponding openings (not shown) in the upper plate 50b of the fixture 50a.

Figure 7:
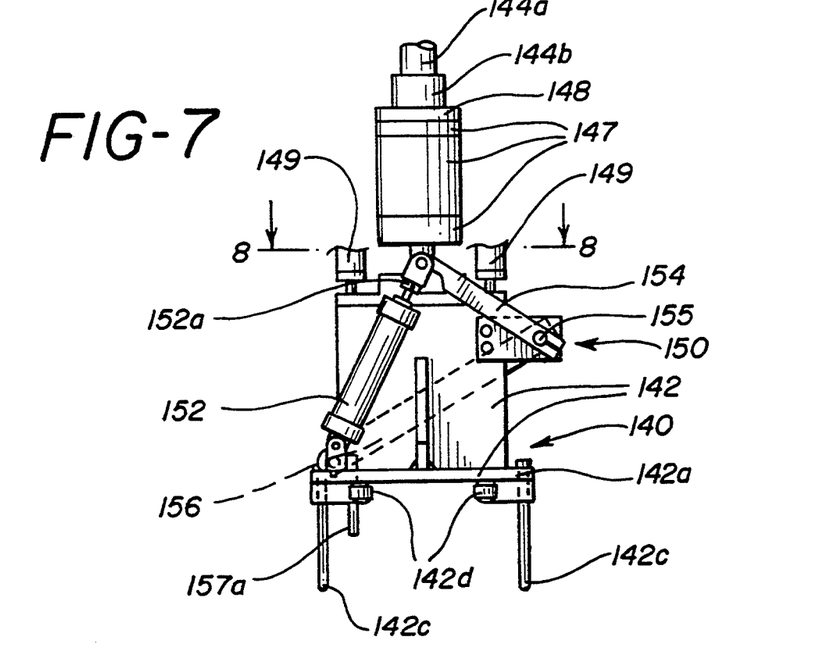
FIG. 7 is a side view of the stripper mechanism of the folding apparatus shown in FIG. 1.
Figure 8:
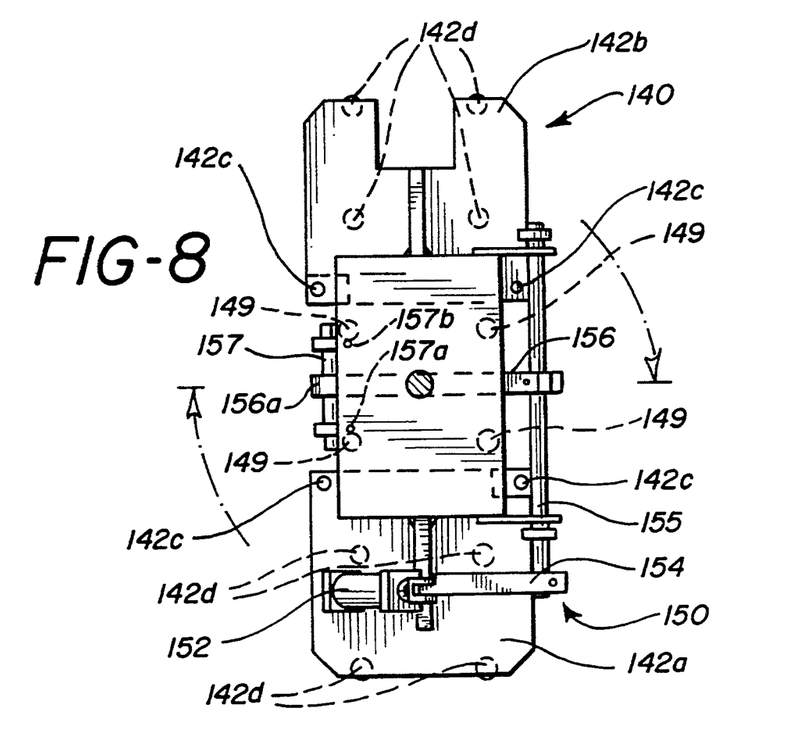
FIG. 8 is a view along section line 8—8 in FIG. 7.

The stripper mechanism 150 comprises a piston/cylinder unit 152 which is fixedly connected to the lower plate 142a, see FIGS. 7 and 8. The piston 152a of the piston/cylinder unit 152 is connected to a first drive element 154 which, in turn, is fixedly connected to a shaft 155. Thus, movement of the piston 152a and, hence, the first drive element 154, effects rotational movement of the shaft 155. A second drive element 156 is also fixedly connected to the shaft 155 for rotational movement therewith. A shaft 157 extends transversely through and is fixed to the distal end 156a of the second drive element 156. First and second stripper fingers 157a and 157b are fixedly connected to opposing ends of the shaft 157. Thus, when the piston 152 is in its retracted position, such as shown in FIG. 7, the stripper fingers 157a and 157b are in their "down" position. Conversely, when the piston 152 is in its extended position, the stripper fingers 157a and 157b move to their "up" position.

A light curtain is defined about the outer perimeter of the apparatus 10 via a light source 160, first, second and third mirrors 162a–162c and a photodetector 164, see FIG. 1. When the light curtain is broken, the apparatus 10 is shut-down by the processor 90.

The processor 90 receives signals generated by each of the sensors set out herein and controls the operation of each of the piston/cylinder units to effect the folding of the airbag 20 as described herein. A control monitor 166 is connected to the processor 90 and displays the status of each piston/cylinder unit, allows an operator to input commands for operating the various piston/cylinder units, and displays error codes. The monitor 166 is commercially available from General Electric and is designated the General Electric Panel View Monitor. The processor 90 is commercially available from General Electric and is designated the General Electric Controller Series 90/30.

In FIG. 11, the pivotable blade 102 is shown in its disengaged position prior to clamping a first portion 24a of the inflatable bag portion 24. Additionally, the folding blades 110c and 110f of the first folding mechanism 110 and the folding blades 120c and 120f of the second folding mechanism 120 are shown separated prior to grasping second and third portions 24b and 24c of the bag portion 24.

An operator places the can portion 22 on the upper plate 50b of the fixture 50a. The operator then actuates one of two switches 170, shown in FIG. 1, to cause the grippers 51 to grip opposing edge portions of the opening 22b to secure the can portion 22 in position prior to folding.

Figure 12:
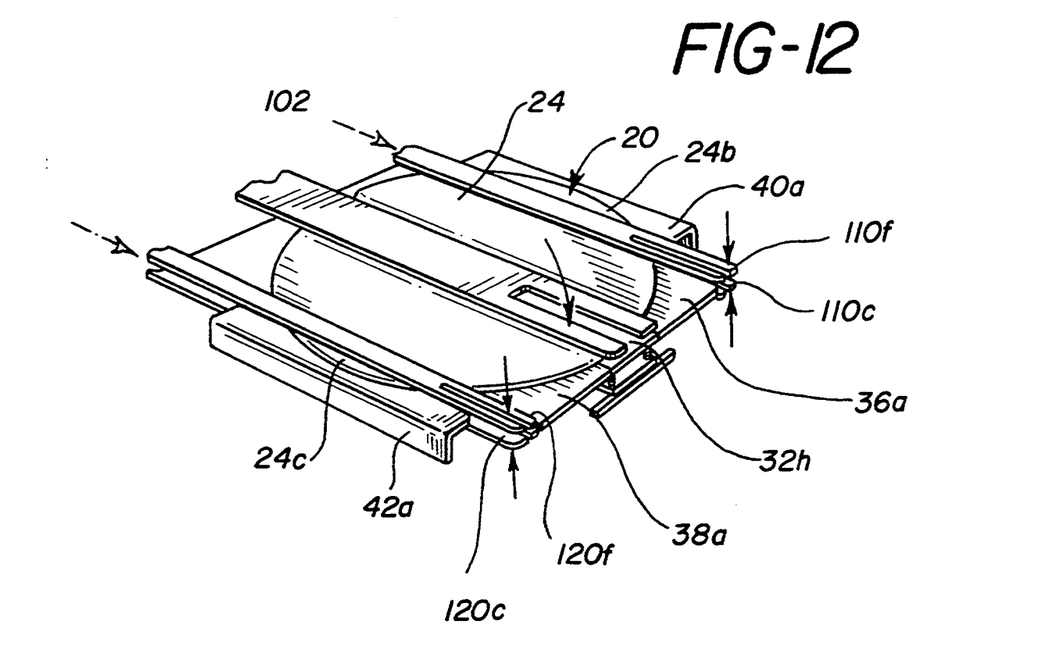
FIGS. 12-20 are sequential views illustrating the folding of an airbag employing the apparatus of the present invention.

When the can portion 22 has been secured in position and the bag portion 24 is laying smooth and flat on the tables 32, 34, 36, 38, 40 and 42, the operator again actuates one of the two switches 170. Thereafter, the upper tooling 70 is rotated via the rotary actuator 147 approximately 90° from the position shown in FIG. 3. The carriage 60 is moved via the drive unit 63 to its first folding position, shown in FIG. 1, where the proximity switch 66a is positioned across from the pin 68a. The pivotable blade 102 is then moved to its "down" position to clamp the first portion 24a of the bag to the tables 32 and 34, see FIG. 12. Next, the folding blades 110c and 110f of the first folding mechanism 110 and the folding blades 120c and 120f of the second folding mechanism 120 are closed so as to grasp the second and third portions 24b and 24c of the bag portion 24.

Figure 13:
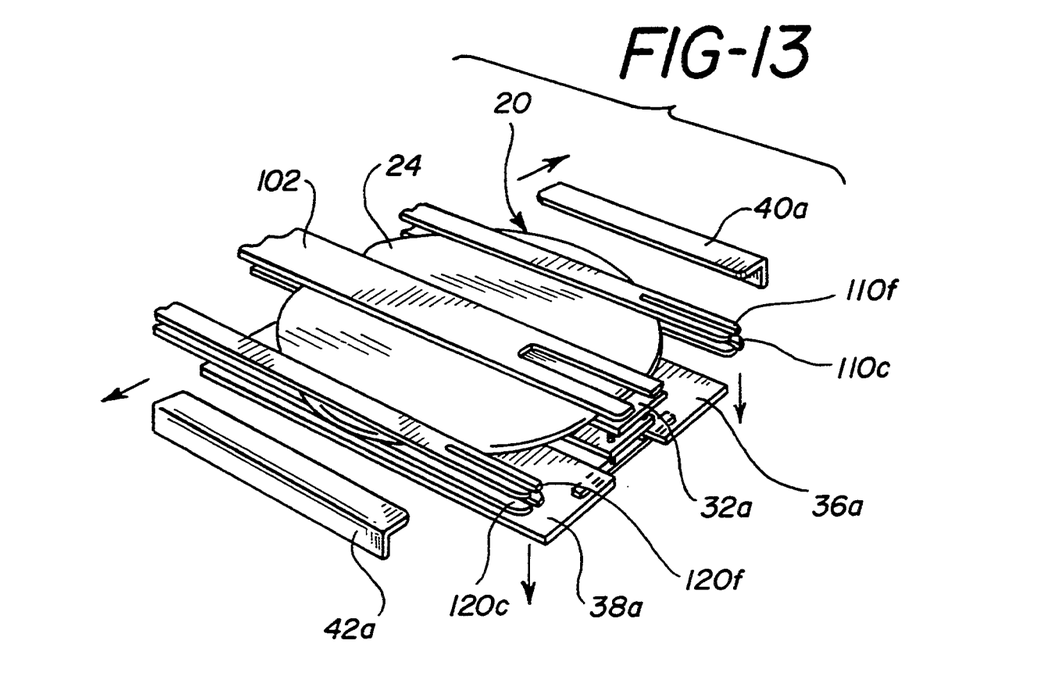
Figure 14:
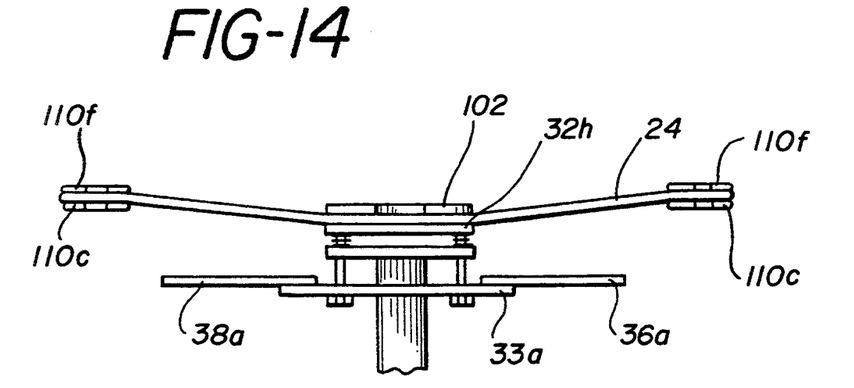

After the folding blades 110c 110f, 120c and 120f have been closed, the plates 40a and 42a are moved horizontally out from between the folding blades 110c, 110f, 120c and 120f, see FIGS. 13 and 14. The plates 36a and 38a are lowered. Further, the first plate 50b of the fixture 50a and, hence, the can portion 22 of the airbag 20 are lowered via the piston/cylinder units 50f and 50g. The lowered position of the first plate 50b is detected by the sensor 50m. The lowering of the plates 36a and 38a also effects the lowering of the plates 32h and 34h via engagement of the lower surfaces of the plates 36a and 38a with the bars 33a, 33b and 35a, 35b, see FIG. 14.

Figure 15:
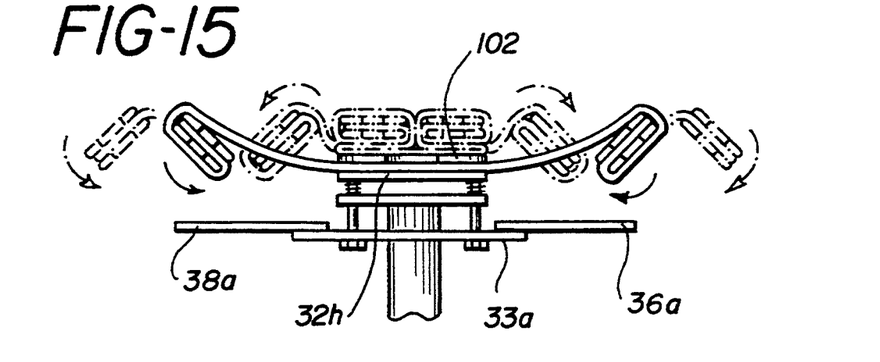
Figure 16:
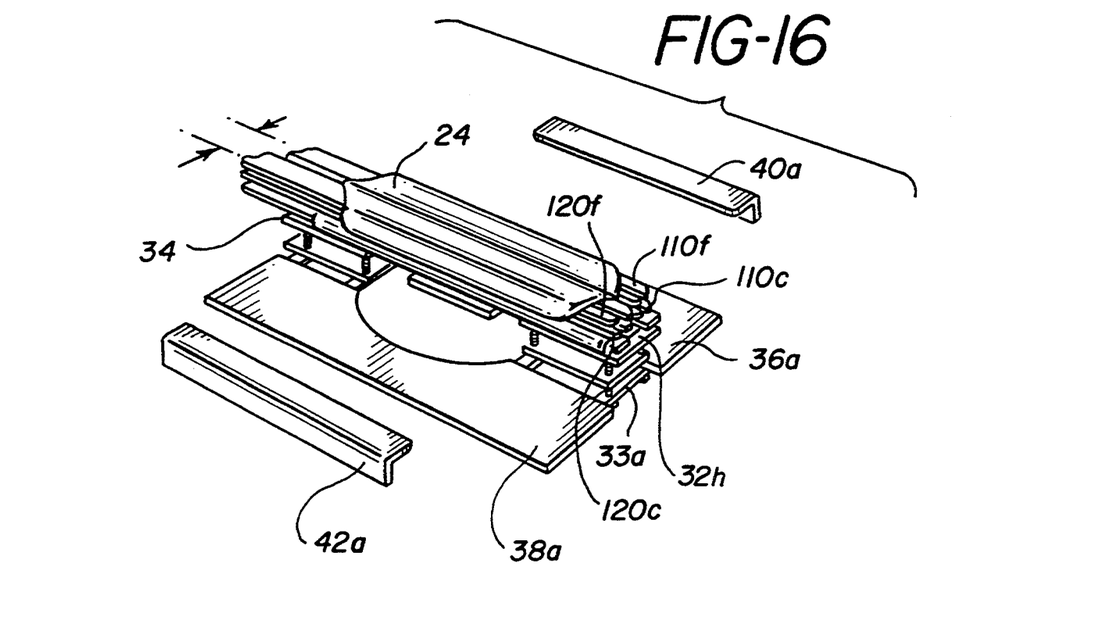

Next, the folding blades 110c, 110f, 120c and 120f are rotated via rotary drive units 110b and 120b approximately 360° and simultaneously moved inwardly toward one another to create first folds in the bag portion 24, see FIGS. 15 and 16. The blades 110c, 110f, 120c and 120f move inwardly as a result of movement of the support plates 110a and 120a via the rodless cylinders 116 and 126.

Figure 17:
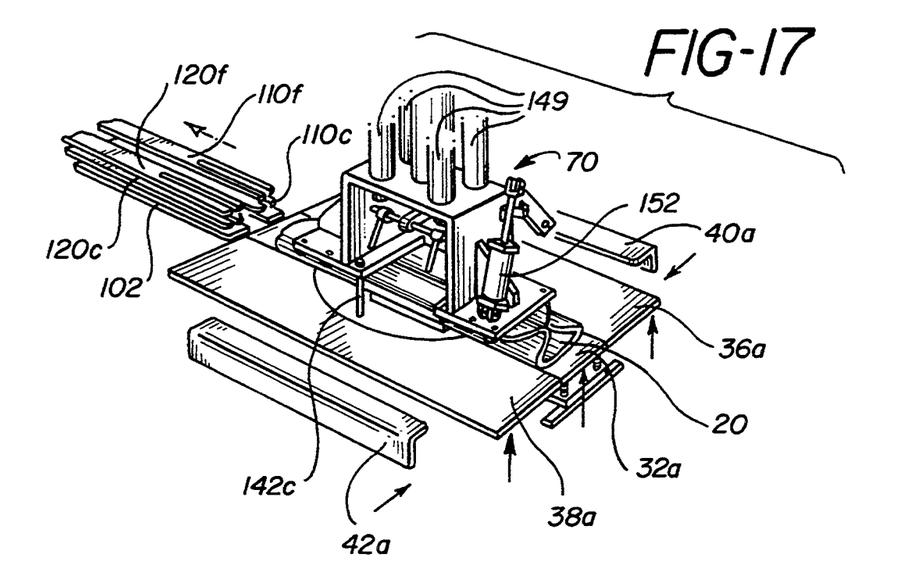

After the first folds have been created in the airbag 20, the upper tooling 70 is lowered via the piston/cylinder unit 144 until the rubber stoppers 142d engage the partially folded bag portion 24, see FIG. 17. The rubber stoppers 142d serve to retain the first folds in the partially folded bag portion 24. As the upper tooling 70 is lowered, engagement pins 142c enter into corresponding openings (not shown) in the upper plate 50b of the fixture 50a.

After the first folds have been made and the upper tooling 70 has been lowered, the piston 152 remains in its extended position so that the stripper fingers 157a and 157b are in their "up" position. Further, the fold retaining piston/cylinder units 149 are not activated and, hence, their corresponding hold-down elements do not engage with the airbag 20.

Following the lowering of the upper tooling 70, the second blades 110f and 120f are moved upwardly away from their associated first blades 110c and 120c until they engage the stop block 103, which block 103 is shown in FIG. 2. The carriage 60 is then moved to its retracted position, where the sensor 66c is positioned directly across from the pin 68c. Thereafter, the plates 36a, 38a, 32h and 34h are returned to their "up" positions and the plates 40a and 42a are moved inwardly so as to be positioned adjacent to the plates 36a and 38a (see FIG. 17).

Figure 18:
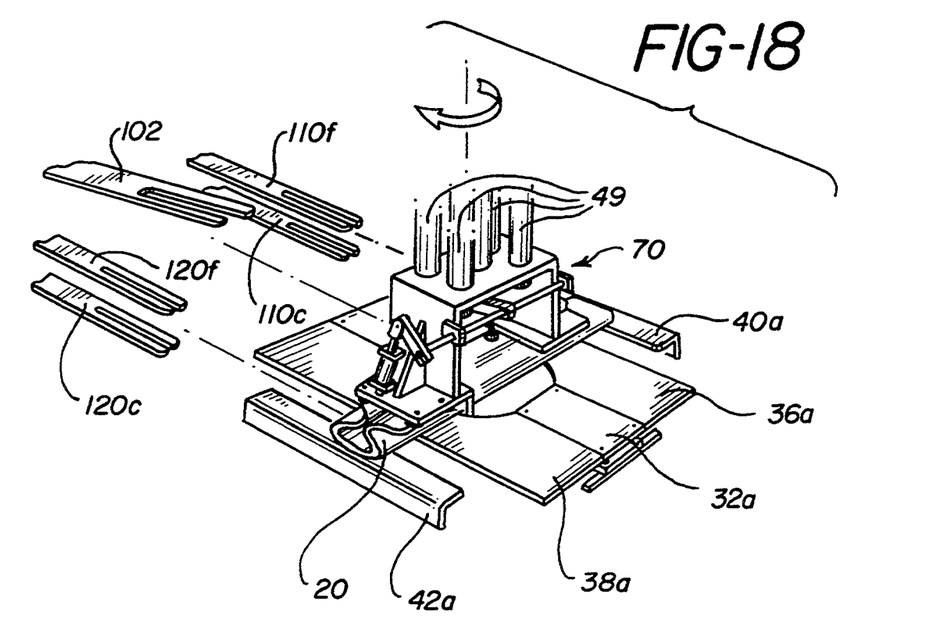

The following homing events occur after the carriage 60 has been moved to its retracted position. The first and second piston/cylinder units 119 and 129 are actuated causing their respective pistons 119a and 129a to extend outwardly. The folding mechanisms 110 and 120 are then moved apart from one another along the guide rails 112 and 114 via the rodless cylinders 116 and 126 until their respective stop members 118 and 128 engage with the pistons 119a and 129a. When this has occurred, the folding mechanisms 110 and 120 are positioned in their second folding positions. Thereafter, the second blades 110f and 120f separate an additional distance from their associated first blades 110c and 120c such that the blades 110c, 110f, 120c and 120f are positioned as shown in FIG. 18. The rotary drive units 110b and 120b rotate the folding blades 110c, 110f, 120c and 120f approximately 360° back to their initial positions. When the folding blades 110c, 110f, 120c and 120f are in their initial positions, flags 200a and 200b associated with the blades 110c and 120c are positioned across from and sensed by sensors 202a and 202b, see FIG. 1. The pivotable blade 102 is moved to its "up" position, shown in phantom in FIG. 2.

Also while the carriage 60 is in its retracted position, the rotary actuator 147 of the upper tooling 70 is vented to atmosphere and the rotary drive unit 50h is activated to rotate the fixture 50a and, hence, the upper tooling 70 and the can portion 22 approximately 90°, see FIG. 18. After being rotated approximately 90°, the can portion 22 is positioned in its second folding position, which is sensed via the sensor 50k.

Figure 19:
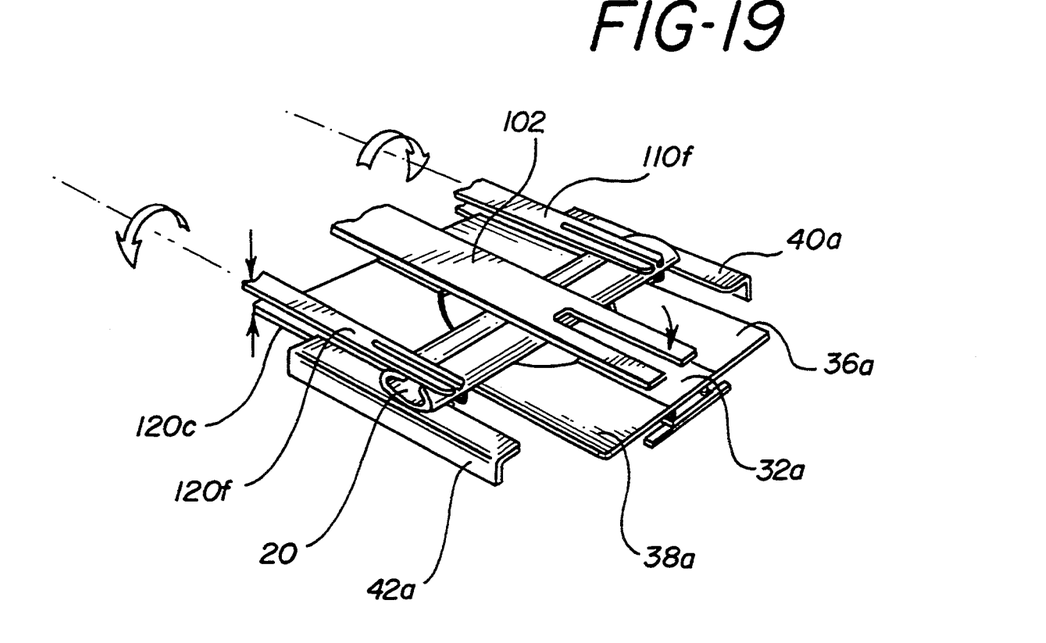

With the can portion 22 and the first and second folding mechanisms 110 and 120 positioned in their second folding positions, the carriage 60 is moved forward to its second folding position where the sensor 66b is positioned across from the pin 68b. Thereafter, the pivotable blade 102 is moved to its "down" position to clamp a middle portion of the partially folded bag portion 24 to the tables 32 and 34, see FIG. 19. The folding blades 110c and 110f of the first folding mechanism 110 and the folding blades 120c and 120f of the second folding mechanism 120 are then closed to grasp opposing end portions of the partially folded bag portion 24.

Figure 20:
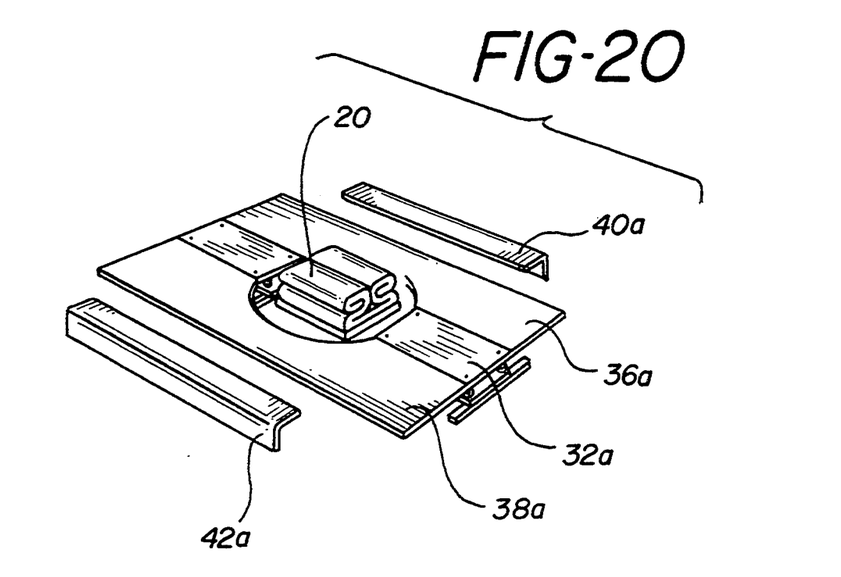

After the folding blades 110c, 110f, 120c and 120f have been closed, the upper tooling 70 is raised. The plates 40a and 42a are moved horizontally out from between the folding blades 110c, 110f, 120c and 120f. The plates 36a, 38a, 32h and 34h are also lowered. The folding blades 110c, 110f, 120c and 120f are then rotated via the rotary drive units 110b and 120b approximately 360° and simultaneously moved inwardly toward one another to create second folds in the partially folded bag portion 24 to form a completely folded airbag 20. The completely folded airbag 20 is shown in FIG. 20. The blades 110c, 110f, 120c and 120f move inwardly as a result of movement of the support plates 110a and 120a via the rodless cylinders 116 and 126.

After the second folds have been created in the airbag 20, the upper tooling 70 is lowered via the piston/cylinder unit 144 until the engagement pins 142c enter into the corresponding openings (not shown) in the upper plate 50b of the fixture 50a. The piston 152 is then moved to its retracted position so that the stripper fingers 157a and 157b move downwardly and pass through the slot 102a in the blade 102. The stripper finger 157a also engages slots 121 in the blades 120c and 120f while the stripper finger 157b engages slots 111 in the blades 110c and 110f. Also, the fold retaining piston/cylinder units 149 are activated causing their hold-down elements 142d to engage the folded bag portion 24.

After the upper tooling 70 has been lowered, the second blades 110f and 120f are move upwardly away from their associated first blades 110c and 120c until they engage the stop block 103. The carriage 60 is then moved to its retracted position. As the carriage 60 is retracted, the bag portion 24 is prevented from moving with the blades 110c, 110f, 120c and 120f via the stripper fingers 157a and 157b. After the carriage 60 has been retracted, the plates 36a, 38a, 32h and 34h are returned to their "up" positions and the plates 40a and 42a are moved horizontally to their home positions adjacent to the plates 36a and 38a. Also, the operator grips the folded airbag 20 and activates one of the two switches 170, causing the upper tooling 70 to rise. The completely folded airbag 20 is then removed by the operator.

After the carriage moves to its retracted position, the piston/cylinder units 119 and 129 are deactivated, the first and second folding mechanisms 110 and 120 return to their initial positions shown in FIG. 1, the second blades 110f and 120f separate an additional distance from their associated first blades 110c and 120c (see FIG. 11), the rotary drive units 110b and 120b rotate the folding blades 110c, 110f, 120c and 120f to their initial positions, the pivotable blade 102 is moved to its "up" position, and the first plate 50b of the fixture 50a returns to its "up" position.

Having described the invention in detail and by reference to preferred embodiments thereof, it will be apparent that modifications and variations are possible without departing from the scope of the invention as defined in the appended claims.

What is claimed is:

1. An apparatus for folding an airbag comprising:
   means for supporting an airbag to be folded;
   means for securing an airbag in position relative to said supporting means;
   a carriage movable towards and away from said supporting means and said securing means;
   means associated with said carriage for clamping a first portion of said airbag to said supporting means;
   first and second folding means associated with said carriage for grasping second and third portions of said airbag and creating first folds in said airbag to form a partially folded airbag;
   means for engaging said partially folded airbag for maintaining said first folds in said partially folded airbag;
   one of said engaging means and said securing means further rotating said engaged partially folded airbag about a vertical axis; and
   said first and second folding means further grasping opposing portions of said partially folded airbag and creating second folds in said partially folded airbag to form a completely folded airbag.

2. An apparatus for folding an airbag as set forth in claim 1, wherein said first folding means comprises a first pair of folding blades supported by first carrier means for transverse movement along a first axis and for rotational movement about a second axis which is generally transverse to said first axis, and said second folding means comprises a second pair of folding blades supported by a second carrier means for transverse movement generally along said first axis and for rotational movement about a third axis which is generally transverse to said first axis.

3. An apparatus for folding an airbag as set forth in claim 1, wherein said clamping means comprises a pivotable blade positioned between said first and second folding means.

4. An apparatus for folding an airbag as set forth in claim 1, wherein said support means comprises:
   first and second spring-biased plates;
   third and fourth plates which are vertically movable; and
   fifth and sixth plates which are horizontally movable.

5. An apparatus for folding an airbag as set forth in claim 4, wherein said airbag includes a can portion secured to an inflatable bag portion, and said securing means comprises a fixture, grippers associated with said fixture for locking said can portion to said fixture, and means for rotating said fixture about said vertical axis.

6. An apparatus for folding an airbag as set forth in claim 5, wherein said engaging means comprises:
   a main support;
   means for reciprocating said main support towards and away from said supporting means;
   means for rotating said main support about a vertical axis; and
   a plurality of reciprocating fold retainers for engaging said airbag.

7. An apparatus for folding an airbag as set forth in claim 6, wherein each of said plurality of reciprocating fold retainers comprises a piston/cylinder unit and a rubber engagement member secured to the distal end of said piston/cylinder unit.

8. An apparatus for folding an airbag as set forth in claim 6, wherein said main support includes first and second support plates each having at least one engagement pin for engaging a corresponding opening in said fixture.

9. An apparatus for folding an airbag as set forth in claim 6, wherein said engaging means further comprises stripper means for engaging said completely folded airbag as said first and second folding means release and move away from said completely folded airbag.

10. A method for folding an airbag comprising the steps of:
    clamping a first portion of said airbag;
    folding second and third portions of said airbag to create first folds in said airbag to form a partially folded airbag;
    engaging said partially folded airbag to maintain said first folds in said partially folded airbag;
    rotating said engaged partially folded airbag about a vertical axis; and,
    folding opposing portions of said partially folded airbag to create second folds in said partially folded airbag to form a completely folded airbag.

11. A method for folding an airbag as set forth in claim 10, wherein said step of folding second and third portions of said airbag to create first folds in said airbag comprises the steps of:
    grasping said second portion of said airbag with a first pair of folding blades;
    grasping said third portion of said airbag with a second pair of folding blades; and,
    moving said first and second sets of blades toward one another while simultaneously rotating each of said first and second sets of folding blades, thereby creating said first folds in said airbag.

12. A method for folding an airbag as set forth in claim 10, wherein said step of folding opposing portions of said partially folded airbag to create second folds in said partially folded airbag comprises the steps of:
    grasping one of said opposing portions of said partially folded airbag with said first pair of folding blades;
    grasping the other of said opposing portions of said partially folded airbag with said second pair of folding blades; and,
    moving said first and second sets of blades toward one another while simultaneously rotating each of said first and second sets of folding blades, thereby creating said second folds in said partially folded airbag.

* * * * *